United States Patent [19]
Majeed et al.

[11] Patent Number: 5,332,061
[45] Date of Patent: Jul. 26, 1994

[54] ACTIVE VIBRATION CONTROL SYSTEM FOR ATTENUATING ENGINE GENERATED VIBRATIONS IN A VEHICLE

[75] Inventors: Kamal N. Majeed; John F. Hoying, both of Centerville; Joan B. Arwine, Vandalia, all of Ohio

[73] Assignee: General Motors Corporation, Detroit, Mich.

[21] Appl. No.: 30,965

[22] Filed: Mar. 12, 1993

[51] Int. Cl.$^5$ .................. B62D 131/00; B60K 5/12
[52] U.S. Cl. .................. 180/312; 180/902; 267/140.15
[58] Field of Search .............. 180/291, 299, 300, 312, 180/902; 267/140.11, 140.14, 140.15; 364/424.01; 381/71

[56] References Cited

U.S. PATENT DOCUMENTS

| | | | |
|---|---|---|---|
| 4,562,589 | 12/1985 | Warnaka et al. | 381/71 |
| 4,715,559 | 12/1987 | Fuller | 244/1 N |
| 4,837,834 | 6/1989 | Allie | 381/71 |
| 4,869,474 | 9/1989 | Best et al. | 180/902 X |
| 4,878,188 | 10/1989 | Ziegler, Jr. | 364/724.01 |
| 5,010,576 | 4/1991 | Hill | 381/71 |
| 5,060,919 | 10/1991 | Takano et al. | 180/312 X |
| 5,146,505 | 9/1992 | Pfaff et al. | 381/71 |
| 5,219,037 | 6/1993 | Smith et al. | 180/312 |
| 5,226,500 | 7/1993 | Doi et al. | 180/312 |

FOREIGN PATENT DOCUMENTS

| | | |
|---|---|---|
| 412853 | 2/1991 | European Pat. Off. |
| 0109119 | 4/1989 | Japan .................. 180/312 |
| 2201858 | 9/1988 | United Kingdom . |

OTHER PUBLICATIONS

Hagino, et al, "Active Control for Body Vibration of F.W.D. Car," SAE Paper No. 860552 (0148-7191/86/0224-0552), 1986.

*Primary Examiner*—Brian L. Johnson
*Attorney, Agent, or Firm*—Jimmy L. Funke

[57] ABSTRACT

An active vibration control (AVC) system is disclosed for attenuating vibrational frequency components generated by an engine and transferred through an engine mounting unit to vibrate a motor vehicle body. The motor vehicle is characterized by sprung mass and unsprung mass natural resonant frequencies at which the body also vibrates when the vehicle is driven over an undulating road surface. The AVC system operates by generating input signals representing different vibrational frequency components generated by the engine based upon sensed changes in engine rotation. Each input signal is filtered by an adaptive filter to produce a respective output signal. The output signals are summed to produce a canceling signal for driving an inertial mass shaker mounted on the body. The shaker inversely vibrates the body with respect to the different vibrational frequency components transferred to the body from the engine. A vibration sensor mounted to the body proximate the shaker monitors body vibration and develops a representative error signal. Vibrational components associated with the sprung and unsprung mass natural resonant frequencies are substantially removed from the error signal using a dual notch filter. The filtered error signal is then used to adjust the filtering characteristics of the adaptive filter to minimize vibration of the body caused by the different vibrational frequency components transferred to the body from the engine.

10 Claims, 9 Drawing Sheets

ACTIVE VIBRATION CONTROL SYSTEM FOR ATTENUATING ENGINE GENERATED VIBRATIONS IN A VEHICLE

BACKGROUND OF THE INVENTION

This invention relates generally to active vibration control (AVC) systems used for attenuating undesirable vibrations, and more particularly, to an AVC system utilized for attenuating vibrations that are generated by an internal combustion engine and transferred to a vehicle body.

Internal combustion engines generate vibrations having frequency components that are related to the rotational speed of the engine. These engine vibrations are transferred to a vehicle body through engine mounting units used to anchor the engine to the vehicle body. The transferred vibrations can be quite annoying to vehicle passengers, and it is generally desirable to reduce such vibrations to improve passenger comfort.

In the past, active vibration control systems have been used to reduce engine generated vibrations that are coupled to the vehicle body. This is typically accomplished by inversely vibrating the vehicle body by generating canceling vibrations having frequency components with essentially the same amplitudes as the transferred engine vibrations, but shifted by 180 degrees in phase. The canceling vibrations combine with the transferred engine vibrations to reduce overall vibration of the vehicle body.

Because the amplitude and frequency content of engine generated vibrations can vary quite significantly with changes in engine rotational speed, digital signal processing and adaptive filtering techniques are generally used when implementing vehicle AVC systems. One such system is disclosed in U.S. Pat. No. 5,146,505, which has issued to Pfaff et al. and has been assigned to the same assignee as the present application. In this system, a signal having frequency components corresponding to those of the engine generated vibrations is derived from a sensed engine rotational speed signal. This derived signal is then applied to the input of an adaptive filter and is transformed by the filter characteristics into an output signal. The adaptive filter output signal is used for driving a cancellation actuator, such as an electromechanical vibrator mounted on the vehicle body. The vibrator produces canceling vibrations that are superimposed with the undesirable engine generated vibrations that are transferred to the vehicle body. An error sensor, such as an accelerometer is used to measure the combined vibration of the vehicle body, and to develop a representative error signal, which provides information to the AVC system for modifying the characteristics of the adaptive filter to minimize the overall vibration level of the vehicle body.

Such systems adequately attenuate engine generated vibrations when the vehicles are stationary. However, when the vehicles are moving over a road surface, it has been found that these AVC systems can exhibit excessive use of power and instabilities, which prevent the efficient and effective cancellation of engine vibrations that are transferred to the vehicle body.

Consequently, there exists a need for an active vibration control system that is efficient and effective in reducing engine generated vibrations that are transferred to a vehicle body not only when the vehicle is stationary, but also when the vehicle is driven over a road surface.

SUMMARY OF THE INVENTION

The applicants have found that the excessive use of power and unstable behavior exhibited by the above described conventional type of AVC system are related to relatively large amplitude body vibrations that become excited when the motor vehicle is driven over undulating road surfaces. These vibrations occur at frequencies near one or more of the natural resonant frequencies characterizing the motor vehicle, and are sensed by the AVC error sensors. Since the amplitudes of the resonant vibrations can be several orders of magnitude greater than the amplitudes of body vibrational components transferred from the engine, the level of error signals developed by the error sensors tend to be dominated by the resonant vibrations. As a result, the error signals no longer provide the AVC system with the proper information for appropriately minimizing body vibrations transferred from the vehicle engine.

The present invention is directed toward providing an active vibration control system that is capable of efficiently and effectively attenuating engine generated vibrational components transferred to a vehicle body through an engine mounting unit when the vehicle is driven over undulating road surfaces. Broadly, this is accomplished by generating an input signal representing at least one of the vibrational frequency components transferred from the engine to the body through the mounting unit; filtering this input signal to produce an output signal using an adaptive filter that has adjustable filtering characteristics; inversely vibrating the body with respect to at least one of the vibrational frequency components transferred from the engine to the body; sensing the vibration of the body using an error sensor, which develops an error signal representative of the vibrational level of the body; filtering the error signal with an error filter to produce a filtered error signal, where the error filter includes at least one notch filter having a notch frequency in a defined frequency range embracing a natural resonant frequency characterizing the motor vehicle; and adaptively adjusting the filtering characteristics of the adaptive filter based upon the filtered error signal to minimize vibration of the vehicle body caused by at least one of the vibrational frequency components transferred to the body from the engine.

More specifically, the error filter of the present invention includes one or more notch filters each having a notch frequency in a defined frequency range for one of the natural resonant frequencies associated with the vehicle sprung and unsprung masses characterizing suspension interactions between the vehicle body and the vehicle tire and wheel assemblies.

In the preferred embodiment, the error filter includes dual notch filters having notch frequencies set at the vehicle sprung and unsprung mass natural resonant frequencies. The notch filters effectively remove the corrupting influence of the natural body vibrational resonances from the filtered error signal so that the AVC system can efficiently and effectively operate to reduce body vibrational components transferred from the engine when the motor vehicle is driven over undulating road surfaces.

DESCRIPTION OF THE PREFERRED EMBODIMENT

Figure 1:
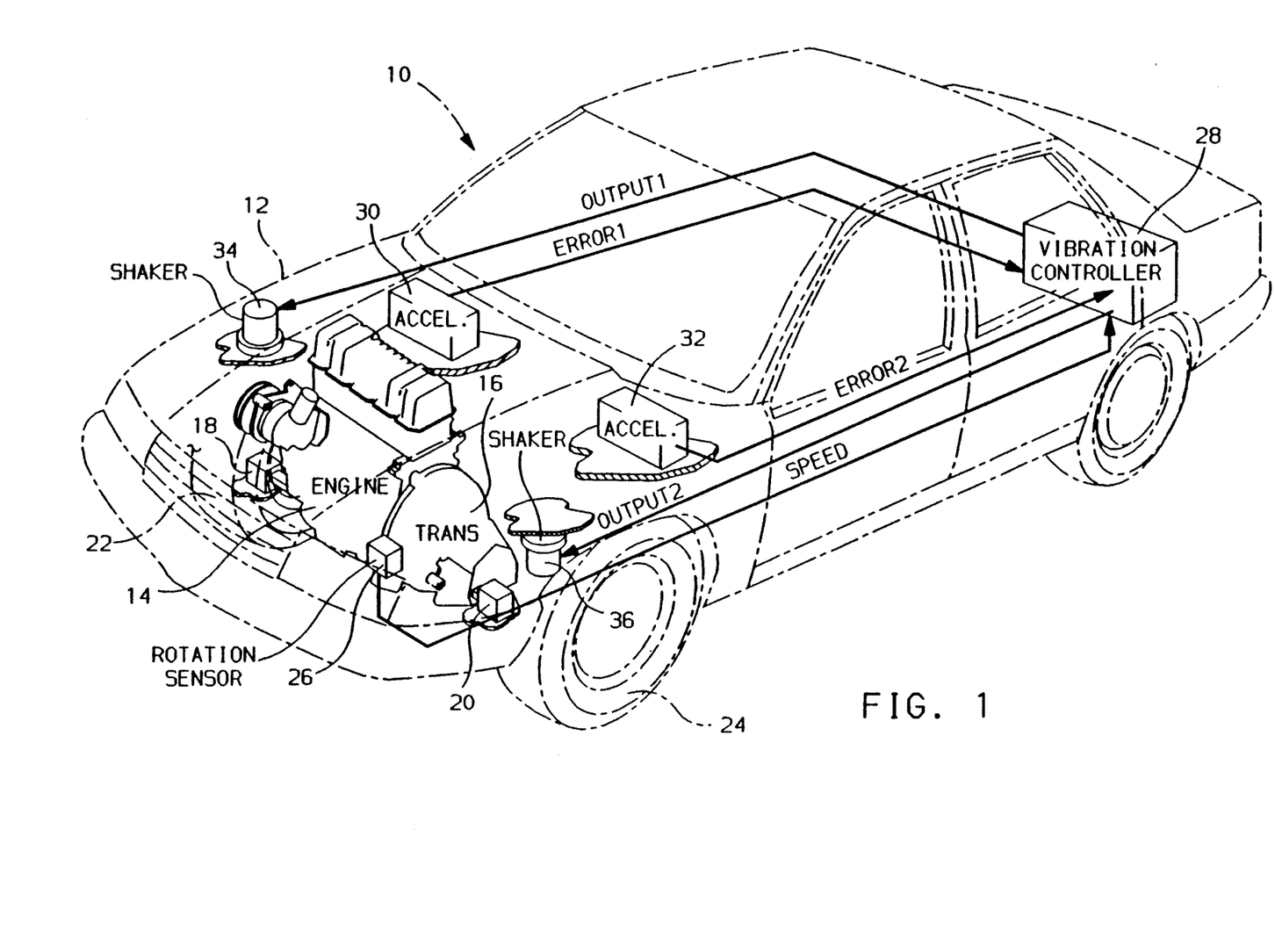
FIG. 1 illustrates schematically a motor vehicle equipped with an active vibration control (AVC) system that operates in accordance with the principles of the present invention.

Referring to FIG. 1, there is shown schematically a motor vehicle 10 equipped with an active vibration control (AVC) system that operates in accordance with the principles of the present invention. The motor vehicle 10 includes a body 12, an engine 14, and a transmission 16. The engine 12 and transmission 16 are supported on body 12 by mounting units 18 and 20 in a standard configuration for driving front wheels 22 and 24 of the motor vehicle 10. Engine 14 includes a conventional rotation sensor 26, such as a variable reluctance or magnetoresistive sensor, for detecting rotation of a toothed wheel, such as the engine flywheel (not shown in FIG. 1). The rotation sensor develops a SPEED signal having pulses corresponding to the passage of wheel teeth by the sensor 26.

During operation, engine 14 generates mechanical vibrations containing sinusoidal components having amplitudes and frequencies that vary in relation to the rotational speed of the engine. In general, the frequencies of the vibrational components are known to be the even, odd, and half-order multiples of the fundamental frequency of rotation of the engine 14 (in revolutions per second). These engine generated vibrational frequency components are transferred through the mounting units 18 and 20 to vibrate the vehicle body 12.

As will now be described, the present invention is directed toward providing an active vibration control (AVC) system capable of reducing vibration of the vehicle body 12 caused by the transfer of one or more of the engine generated vibrational frequency components when the motor vehicle is driven over an undulating road surface.

The AVC system of the present embodiment includes a dual channel vibration controller 28, two vibration sensors 30 and 32, and two actuators 34 and 36. The vibration sensors 30 and 32 are mounted to the body 12 at opposites sides of the motor vehicle 10 proximate the mounting units 18 and 20, and are used to monitor the vibration of body 12. In the present embodiment, the vibration sensors are conventional accelerometers, but alternatively, any other known displacement or vibration measuring devices could also be used. The actuators 34 and 36 are also mounted to the vehicle body 12 at opposite sides of the motor vehicle proximate the mounting units 18 and 20, and are used to inversely vibrate the vehicle body with respect to vibrational frequency components transferred to the body 12 from the engine 14. For the present embodiment, the actuators 34 and 36 are electromechanical inertial mass shakers, which are well known in the art (see for example, U.S. Pat. No. 4,715,559 issued to Fuller, and the publication "Active Control for Body Vibration of F.W.D. Car," by Hagino et al., SAE Paper No. 860552 (0148-7191/86/0224-0552), 1986. It will be understood that other known types of actuators for mechanically vibrating the vehicle body in response to electrical signals could also be used, as for example, piezoelectric or electromechanical actuators connected in parallel with the mounting units 18 and 20 between the body 12 and engine 14 (see U.S. Pat. No. 5,146,505 issued to Pfaff et al.).

In operation, the dual channel vibration controller 28 receives the SPEED signal developed by the rotation sensor 26, and develops therefrom, an OUTPUT1 signal from a first channel (denoted as channel 1) to drive actuator 34, and an OUTPUT2 signal from a second channel (denoted as channel 2) to drive actuator 36. The vibration sensors 30 and 32 develop signals ERROR1 and ERROR2, respectively, which are indicative of the vibration of the body 12 at their respective locations. As will become clear from the discussion that follows, the ERROR1 and ERROR2 signals directed to channels 1 and 2, respectively, of the vibration controller 28 function as signals monitoring the reduction in engine generated body vibration achieved by operation of the AVC system.

Figure 2:
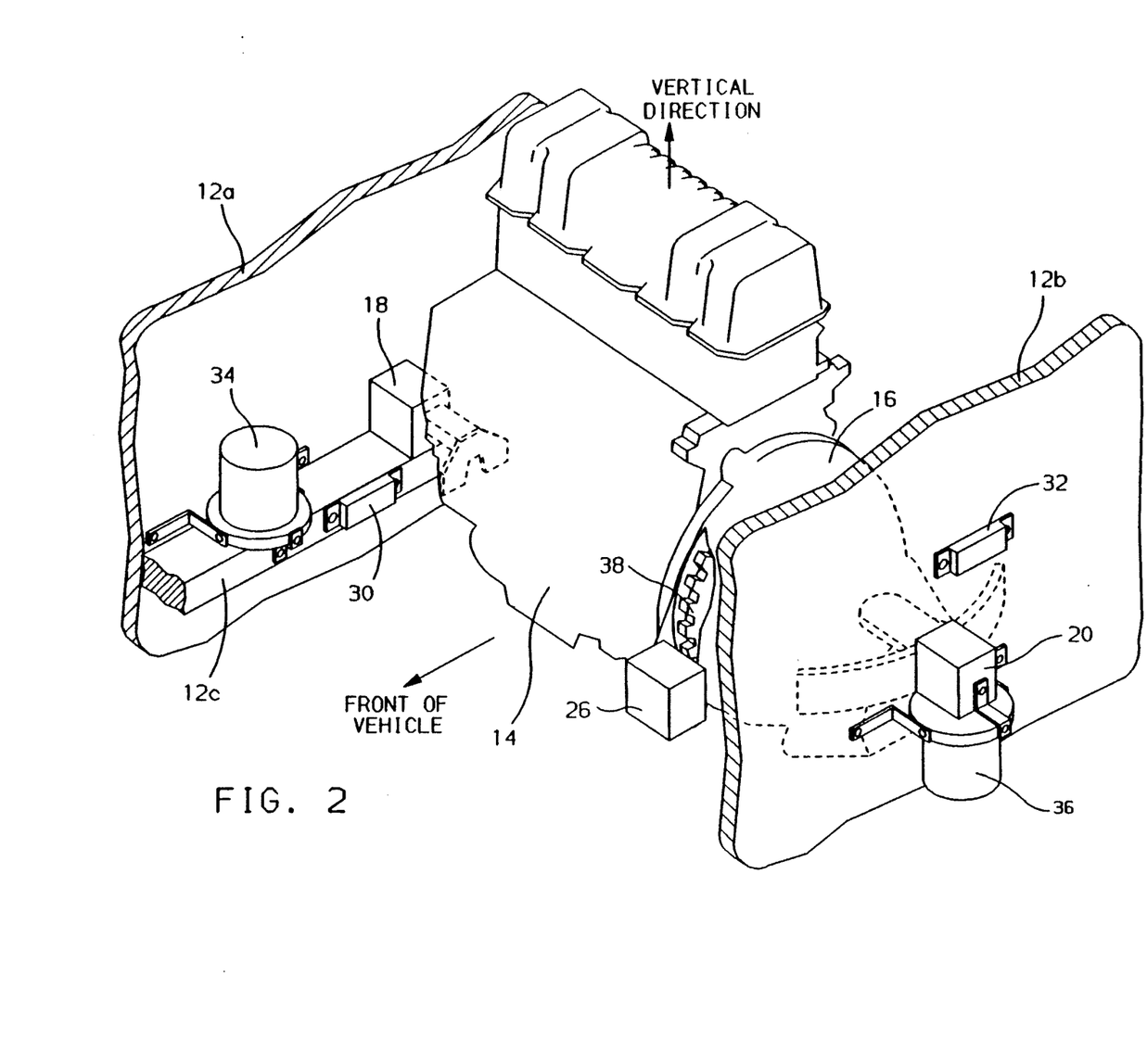
FIG. 2 illustrates in more detail a portion of the motor vehicle body showing the location of sensor and actuator components of the AVC system relative to mounting units supporting the engine and transmission on the vehicle body.

Referring now to FIG. 2, there is shown a more detailed illustration of portions of the motor vehicle body 12 more particularly pointing out the location of components of the vibration control system relative to the mounting units 18 and 20 that support the engine 14 and transmission 16 on the vehicle body panels 12a and 12b.

The mounting units 18 and 20 can be any type of conventional vibration isolating type engine mounts, and typically include body and engine mounting brackets separated by some form of strong, but resilient material such as rubber. Since the present invention does not depend upon the particular structure of these mounting units, they are simply denoted by the numerals 18 and 20 in FIG. 2, without a further breakdown as to their component parts.

Panels 12a and 12b represent portions of the vehicle body 12 separating the engine compartment and wheel wells on opposite sides of the motor vehicle 10. A body rail 12c is also shown attached to the body panel 12a to increase body stiffness.

The mounting units 18 and 20 support the weight of the engine 14 and transmission 16 on the body 12. Consequently, the vibrational frequency components generated by the engine are primarily transferred to the body 12 through the mounting units 18 and 20, which essentially vibrate or cause displacement of the body 12 in the vertical direction. For these reasons, each of the inertial mass shakers 34 and 36 are located proximate a different one of the mounting units 18 and 20, and are oriented to drive their respective inertial masses (not shown) in the vertical direction, so the body 12 can be inversely vibrated with respect to vibrational frequency components transferred from the engine 14 through the mounting units 18 and 20. For the same reasons, each of the accelerometers 30 and 32 are also located proximate a different one of the mounting units 18 and 20, and are oriented to measure the acceleration or vibration of the body in the vertical direction.

When a component, such as one of the actuators (inertial mass shakers 34 or 36), or one of the vibration sensors (accelerometers 30 or 32), is described as being located proximate to one of the mounting units 18 or 20 in the specification and the appended claims, the use of the word proximate is hereby defined to mean that the component is located closer to that particular mounting unit than to any of the other mounting units supporting the engine 14 on the body 12. In other words, when a component is located proximate a particular mounting unit, the component is operatively associated with that particular mounting unit, i.e., the component functions to perform an operation required for reducing engine generated vibrational components transferred to the vehicle body 12 through that particular engine mounting unit.

As a general rule, the inertial mass shakers 34 and 36, and the accelerometers 30 and 32 should also be located as far as practical from any nodes associated with low frequency bending or beaming of the body 12.

For the particular motor vehicle 10 in which the vibration control system was implemented, the inertial mass shaker 34 is mounted to the body panel 12a approximately 20 cm in front of mounting unit 18, while inertial mass shaker 36 is mounted to the body panel 12b directly under the mounting unit 20. Accelerometer 30 is mounted to the body panel 12a via the body rail 12c, and accelerometer 32 is located on body panel 12b approximately 10 cm above the mounting unit 20. Inertial mass shaker 34 and accelerometer 30 are then operatively associated with mounting unit 18 for reducing the vibrational components transferred through it to the body 12, and likewise for inertial mass shaker 36, accelerometer 32, and mounting unit 20.

The positioning of the components as illustrated in FIG. 2, avoids a body bending node believed to be located approximately 50 cm to the rear of the mounting units 18 and 20. It is also believed that mounting inertial mass shaker 34 approximately 20 cm in front of mounting unit 18 provides improved cancellation of body vibrations resulting from engine torque pulses transferred to the body 12 in different directions and from different locations. For example, torque pulses can be transferred to the body 12 through torque struts (not shown) that are commonly connected horizontally between the body 12 and forward and aft positions on the engine 14 to reduce torquing movements of the engine 14 relative to the body 12.

It will be understood that the exact placement of the inertial mass shakers 34 and 36, and the accelerometers 30 and 32 proximate to respective mounting units 18 and 20 will vary for different applications, and types of vehicle bodies and engines, and may have to be determined experimentally.

It will also be recognized from FIG. 2 that the rotational sensor 26 in this embodiment is located to detect the passage of teeth on the internal flywheel 38 of engine 14, which is rotated by the engine crankshaft (not shown).

Figure 3:
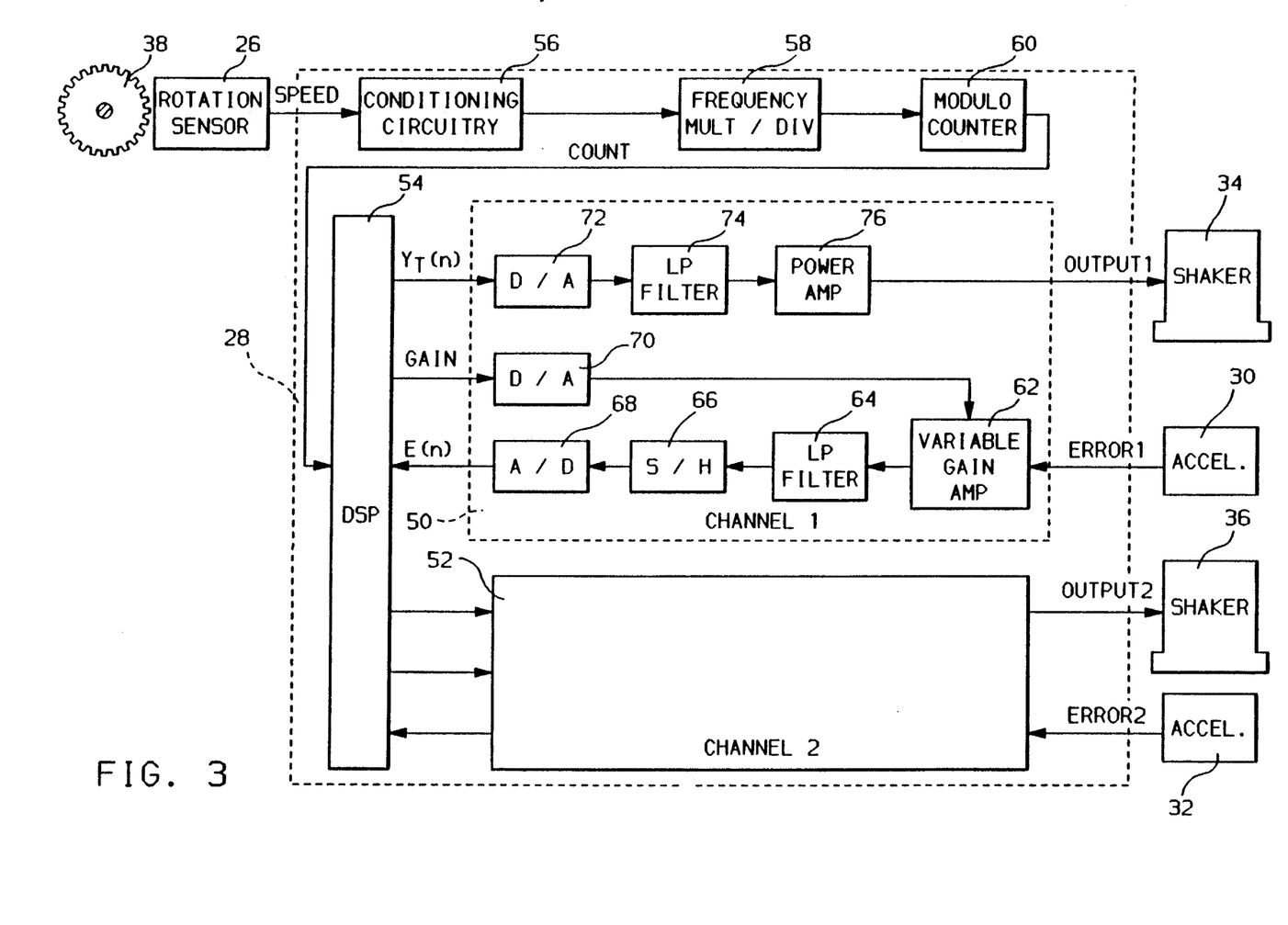
FIG. 3 is a block diagram representative of the electronic components employed in implementing the vibration controller shown in FIG. 1.

Referring now to FIG. 3, electronic circuitry within the vibration controller 28 will now be described in terms of a block diagram containing standard electronic components. Since the second channel 52 of the vibration controller 28 contains the same components as the first channel 50, only the components in the first channel 50 will be described to avoid unnecessary duplication in the specification.

It will be recognized that the implementation shown in FIG. 3 is merely exemplary and is not intended to limit the present invention, since other variations in the hardware are possible, as evident in the numerous patents, texts, and publications directed toward the subject of noise and vibration control, see for example, "Hardware and Software Considerations for Active Noise Control", M. C. Allie, C. D. Bremigan, L. J. Eriksson, and R. A. Greiner, 1988, IEEE, CH 2561-9/88/0000-2598, pp. 2598-2601.

One of the principal electronic components use for implementing the vibration controller 28 is a digital signal processor (DSP) designated by numeral 54. Digital signal processors are commercially available, such as the Motorola 56000, and typically include a central processing unit (CPU) for carrying out instructions and arithmetic operations, random access memory (RAM) for storing data, a programmable read only memory (PROM) for storing program instructions, and clock or timing circuitry, used for example, to establishing the data sampling rate at which the DSP 52 operates. For the multiple channel operation, the DSP 52 can be implemented to function as one or more adaptive filters for each channel, and it operates sequentially to perform the necessary functional operations for each channel within the established data sampling rate (approximately 2.5 KHZ in the present embodiment).

As described previously, engine rotation sensor 26 provides the vibration controller 28 with a SPEED signal that indicates changes in rotational position of the engine 14. The SPEED signal contains pulses generated by the movement of teeth on the engine flywheel 38 past the rotation sensor 26. After entering the vibration controller 28, the SPEED signal is passed to standard conditioning circuitry 56, where the pulses are shaped or squared up into a format compatible with the digital circuitry that follows. These formatted digital pulses represent a measure of the change in the angular rotation of the engine crankshaft with time, and are passed to a standard frequency multiplier/divider circuit 58, which generates a fixed or predetermined number of pulses during one complete rotational cycle of the engine. The pulses from the frequency multiplier/divider 58 are then counted by a conventional modulo counter 60, to provide a digital output signal designated as COUNT. This digital COUNT signal is then used as a reference input signal to the DSP 54 representing the time-varying degree of engine rotation through a complete engine cycle. As such, it will be recognized that the value of the COUNT signal is functionally related to the frequencies of sinusoidal vibrational components generated by the engine 14.

Based upon the number of teeth on flywheel 38, the frequency multiplier/divider 58, and the modulo counter 60 are selected to provide an integer value for COUNT ranging in value from 0 to a maximum value of MAX each time the engine completes a cycle. A complete cycle in a four-stroke engine being two full revolutions of the engine crankshaft. The value of COUNT then represents the time-varying angular rotational position of the engine in an operating cycle, or the fractional portion of an engine cycle completed at any given time (the cycle position).

The DSP 54 uses the COUNT signal to generate digital samples representing one or more sinusoidal signal components having frequencies that correspond to vibrational frequency components generated by the engine 14. The sinusoidal signal components are filtered in accordance with the filtering characteristics of the one or more adaptive filters implemented in each channel of the DSP 54 to produce canceling output signals, which are converted to analog form and appropriately amplified for driving their respective actuators to inversely vibrate the vehicle body with respect to one or more of the vibrational frequency components that are generated by the engine and transferred to vibrate the vehicle body. The vibration sensors monitor the vibration of the body and develop error signals representative of the reduced vibration of the body. The error signals are digitized and directed back to the DSP 54 for use in adjusting the filtering characteristic of the adaptive filters to minimize vibration of the body caused by one or more of the transferred engine generated vibrational frequency components.

Turning now to the particular electronic components in the first channel 50 (channel 1), the analog ERROR1 signal developed by accelerometer 34 is amplified by a variable gain amplifier designated as 62 and then passed through a low pass filter 64 that acts as an anti-aliasing filter to attenuate frequencies in the ERROR1 signal that are above 700 Hz in the present embodiment. The output from low pass filter 64 is then applied to a sample and hold circuit 66, which acts in conjunction with analog-to-digital converter 68 to provide digitized samples $E(n)$ to the DSP 54 that represent the analog ERROR1 signal. $E(n)$ represents the nth or most recently sampled value of ERROR1, $E(n-1)$ represents the $(n-1)$th sample value for ERROR1 obtained during the previous sampling period, and so forth in accordance with standard convention for representing digitally sampled signals.

Based upon the value of the digitized $E(n)$ samples, the DSP 54 supplies a digital GAIN signal to digital-to-analog converter 70, which in turn controls the gain of amplifier 62 to maintain the amplitude of the amplified analog ERROR1 signal within upper and lower limits determined by the input capability of sample and hold circuit 66 and analog-to-digital converter 68. This form of automatic gain control is well known in the art and is commonly used in DSP and microprocessor interfacing circuitry when digitizing an analog signal having an amplitude that can vary over a large dynamic range, such as ERROR1 in this case.

Sequential digital sample values for a canceling output signal $Y_T(n)$ are computed by the DSP 54 in accordance with the filtering characteristics of the one or more adaptive filters implemented by the DSP 54 for filtering the sampled signal components that are generated based on the COUNT signal. These digital output samples for $Y_T(n)$ are directed to digital-to-analog converter 72, where a corresponding analog waveform is produced. The analog waveform is then passed through low pass filter 74, which has an upper cutoff frequency of approximately 700 Hz for this particular application. The low pass filter 74 acts as a smoothing filter to remove any high frequency components introduced by the digital-to-analog conversion process. Next, the filtered analog waveform is amplified by power amplifier 76 to produce the final output signal OUTPUT1, which drives actuator 34 to inversely vibrate the vehicle body 12 with respect to one or more of the engine generated vibrational frequency components transferred to the body 12 through mounting unit 18. During this process, the digital samples $E(n)$ of the ERROR1 signal are used in the DSP 54 to adjust the filtering characteristics of the adaptive filters to minimize vibration of the vehicle body 12 caused by one or more of the engine generated vibrational frequency components.

Figure 4:
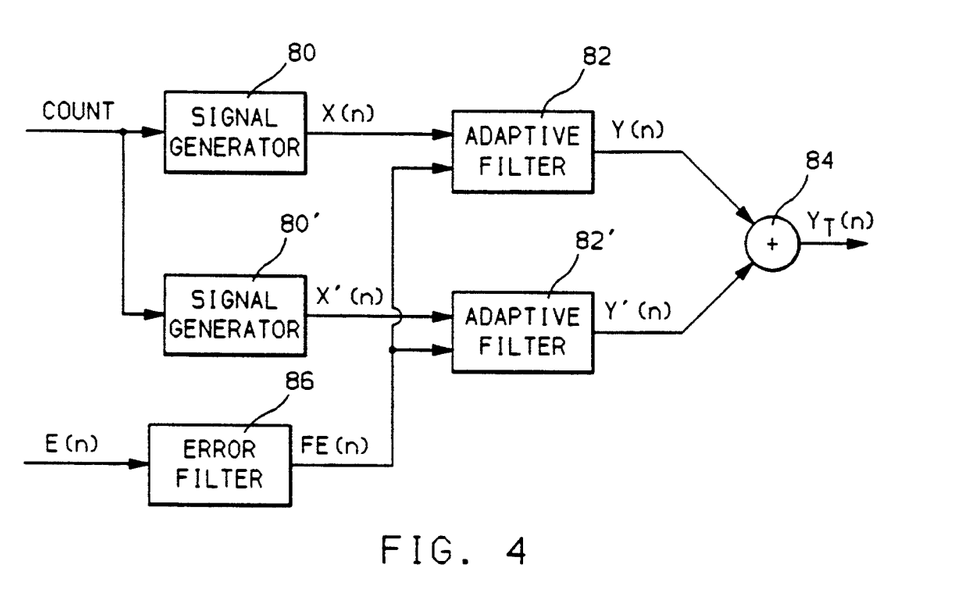
FIG. 4 is a block diagram model containing a parallel configuration of signal generators and paired adaptive filters representing operations implemented by the digital signal processor (DSP) for one channel of the vibrational controller.

Referring now to FIG. 4, there is shown a block diagram model exemplary of the functional operations carried out by the DSP 54 for the first channel 50 in the present embodiment. In general, digital samples of the canceling output signal $Y_T(n)$ are produced, based upon the COUNT signal and the digitally sampled error signal $E(n)$. The model represents a parallel configuration of signal generator and adaptive filter pairs, with the corresponding components and signals in the first and second pairs being respectively denoted by the same unprimed and primed numerals and signal labels. It will be recognized that the DSP 54 implements a similar parallel configuration for the second channel 52 of the vibration controller 28.

The functional model includes two signal generators 80 and 80' and two corresponding paired adaptive filters 82 and 82'. Based upon the common COUNT input signal, the signal generators 80 and 80' respectively generate signals $X(n)$ and $X'(n)$, which act as input signals to the corresponding paired adaptive filter 82 and 82'. The adaptive filters 82 and 82' operate in accordance with their filtering characteristics to filter their respective input signals $X(n)$ and $X'(n)$ to produce corresponding sampled filter output signals $Y(n)$ and $Y'(n)$. The sampled filter output signals $Y(n)$ and $Y'(n)$ are directed to a summer 84, where they are added together to produce the final sampled canceling output signal $Y_T(n)$. The model also includes an error filter 86 for filtering the sampled error signal $E(n)$ to produce a sampled filtered error signal represented by $FE(n)$, which is input to each of the adaptive filters 82 and 82'.

The general operation and implementation of the signal generator 80 and its correspondingly paired adaptive filter 82 will be discussed only briefly in what follows, since a comprehensive description can be found in U.S. Pat. No. 5,146,505 issued to Pfaff et al., which is assigned to the same assignee as the present invention, and is hereby incorporated by reference into the present application. Likewise, since the operation and implementation of second parallel configured signal generator 80' and its correspondingly paired adaptive filter 82' are essentially the same as that for signal generator 80 and adaptive filter 82 with one minor difference, only the difference between the two configurations will be discussed.

Figure 5:
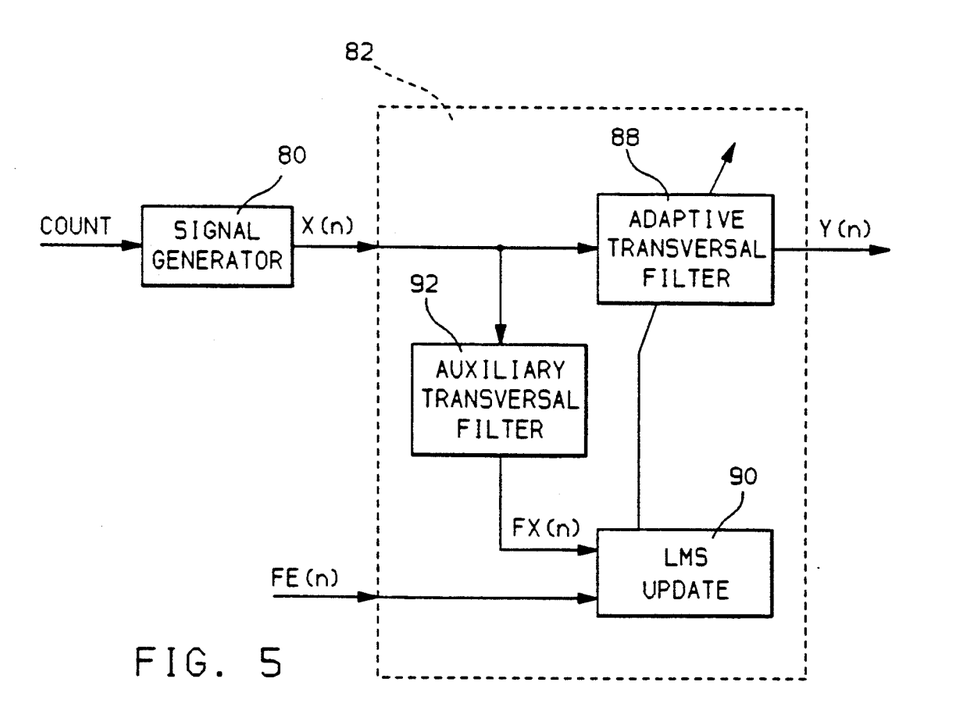
FIG. 5 is a more detailed block diagram model illustrating one of the signal generators and components of the corresponding adaptive filter shown in FIG. 4.

Referring now to FIG. 5, there is shown a more detailed block diagram for the signal generator 80 and components of the correspondingly paired adaptive filter 82. The signal generator 80 produces sample values for the filter input signal X(n) in accordance with the following equation:

$$X(n) = \sum_{m=1}^{M} B_m * \sin(m*q*COUNT), \quad (1)$$

where the $B_m$ terms represent the amplitude of the mth sinusoidal signal component in a summation that can contain a total of M such components, and q is a conversion constant given by $q=2\pi/(MAX+1)$, where MAX is the maximum count reached by the COUNT signal from the modulo counter 60, before it resets to zero to restart counting. It will be recognized that one or more sinusoidal signal components can be removed from the above summation by setting their respective amplitudes to zero, i.e. the mth sinusoidal component can be removed from the signal X(n) by merely setting the amplitude term $B_m=0$ to eliminate any contribution from that component.

It will also be recognized that since COUNT ranges in value from 0 to MAX for each complete engine cycle (two revolutions in a four stroke engine), the frequencies of the sinusoidal components in above equation (1) will be functionally related to, and synchronized with the rotational frequency of the engine (in revolutions per second). For example, if the engine rotates at a frequency of $f_0$ revolutions per second (engine RPM/60), then the frequency of the mth sinusoidal component in the summation of equation (1) is given by $f_m=mf_0/2$. Consequently, by setting the appropriate amplitude terms $B_m$ equal to zero, the sampled filter input signal X(n) produced by the signal generator 80 can be easily adjusted to contain one or more sinusoidal components having frequencies at selected even, odd, and/or half-order multiples of the fundamental frequency of rotation $f_0$ of the engine 14 (i.e., the frequencies of the vibrational components generated by the operation of the engine 14.

The second harmonic ($2f_0$) has generally been found to be the dominant vibrational frequency component generated by four stroke engines, such as the engine 14 used to power the motor vehicle 10. Consequently in the present embodiment, all of the amplitude terms $B_m$ in equation (1) have values of zero, except for $B_4$, which is set equal to unity. As a result, the signal generator 80 produces the sampled signal X(n)=sin(4*q*COUNT). It will be understood that other generated harmonic components can also be included in the signal X(n) by merely using nonzero values for their respective amplitude terms.

In what follows, it will also be understood that when a set of sequential sample values for a digitized signal, such as X(n−N+1),..., X(n−2), X(n−1), and X(n) produced by signal generator 80, are retained in the RAM memory of DSP 54, prior to storing a newly generated sample value in the memory location corresponding to the nth sample value X(n), the previous stored value for X(n) will be shifted downward and stored as the next earlier sample value X(n−1), and likewise for all earlier sample values down to the last retained sample in the sequence, which is designated here as X(n-N+1).

The adaptive filter 82 includes an adaptive transversal digital filter 88, which filters or transforms the sampled filter input signal X(n) to produce the sampled filter output signal Y(n) according to the equation:

$$Y(n) = \sum_{i=0}^{N-1} W_i(n)*X(n-i), \quad (2)$$

where the set of $W_i(n)$ terms represent the most recently computed adaptive filter weighing coefficients defining the filtering characteristics of the adaptive transversal filter 88, and N represents the number of taps or size of transversal filter 88. N also represents the number of samples of the filter input signal X(n) retained in DSP memory for computing the current sample value for the filter output signal Y(n). In general, the number of filter taps N must be greater than at least twice the number of sinusoidal signal components selected to be synthesized by the signal generator 80. In the present embodiment, N has a value of 32.

After each new sample value for the filter output signal Y(n) is computed according to equation (2), the weighing coefficients $W_i(n)$ for the adaptive transversal filter 88 are updated, as indicated by the LMS UPDATE block 90 to minimize the value of the sampled filtered error signal FE(n) in the least mean square (LMS) sense. This updating is accomplished using a known leaky LMS algorithm, although any other known algorithm for adapting filter weighing coefficients to minimize the filtered error signal FE(n) could be used. The LMS UPDATE block 90 has two inputs, the first being the sequence of sample values for the filtered error signal FE(n), and the second being a filtered sequence of sample values designated as FX(n), which are obtained by passing samples of the filter input signal X(n) through an auxiliary transversal filter 92. This auxiliary filtering of the filter input signal X(n) gives rise to the filtered-X nomenclature commonly used to describe this type of adaptive filter configuration.

The preferred leaky LMS algorithm for updating each of the filter weighing coefficients from the present value $W_i(n)$, to the value $W_i(n+1)$ for use during the next sampling interval of the DSP 54, is given by:

$$W_i(n+1)=g*W_i(n)-\mu*FE(n)*FX(n), \quad (3)$$

where g is known as the filter leakage factor, which generally has a value in the range of $0<<g<1$, and $\mu$ is known as the filter convergence factor, which generally has a value in the range of $0<\mu<<1$. The convergence factor $\mu$ is related to the rate at which the sampled filter output signal Y(n) converges to values that minimizes the sampled filtered error signal FE(n). The leakage factor g prevents the accumulation of digital quantization error that typically occurs when using a digital signal processor having fixed point arithmetic capabilities, such as the Motorola 56000 used for DSP 54.

The sequence of sample values for the FX(n) signal required by equation (3) are obtained by filtering the sequence of sample values X(n) produced by the signal generator 80 with the auxiliary transversal filter 92 according to the following equation:

$$FX(n) = \sum_{i=0}^{N-1} E_i * X(n - i), \qquad (4)$$

where the $E_i$ terms for i=0, 1, ..., and N−1 represent the fixed weighing coefficients for the auxiliary transversal filter 92, with N again representing the number of filter taps. As described in "An Analysis of Multiple Correlation Cancellation Loops with a Filter in the Auxiliary Path", D. R. Morgan, IEEE Transactions on Acoustic Speech Signal Processing, Vol. ASSP-28, No. 4, 1980, pp. 454-467, and U.S. Pat. Nos. 5,010,576 and 5,146,505, the function of the auxiliary transversal filter 92 is to compensate for the delay and distortion introduced by components in the error path of the AVC system. For the first channel 50, these components include the inertial mass shaker 34 with all the output circuitry separating the sampled output signal $Y_T(n)$ from the shaker 34, the accelerometer 30 with all of the input circuitry separating the accelerometer 30 from the sampled filtered error signal FE(n), and the characteristics of the physical path in the vehicle body 12 over which vibrations propagate between the shaker 34 and accelerometer 30.

The off line training process used to determine the fixed values for the filter weighing coefficients for auxiliary transversal filter 92 is well known in the art, and will not be further described here (see for example, U.S. Pat. No. 5,146,505). Once the auxiliary transversal filter 92 is trained, it duplicates the delay and distortion of the error path in filtering the samples of X(n) to produce the filtered FX(n) samples that are input to the LMS UPDATE block 88. This is known to improve the stability and convergence rate of the adaptive transversal filter 88.

As stated previously, the operation of signal generator 80' and adaptive filter 82' are the same as for signal generator 80 and adaptive filter 82, except for one difference. This difference concerns the choice of values for amplitude terms for signal generator 80' that correspond to the amplitude terms $B_m$ for signal generator 80. In addition to generating a dominant second order harmonic vibrational component, four stroke engines, such as engine 14, have generally been found to also produce a fourth order harmonic vibrational component that has a significant amplitude at most engine operating speeds. Consequently, in the present embodiment, the signal generator 80' is implemented so that the generated signal X'(n) contains a signal component having a frequency equal to that of the fourth order harmonic vibrational component (4$f_0$) generated by engine 14. This is achieved by setting all $B'_m$ terms to zero with the exception of $B'_8$, which is set equal to unity. As a result, the sampled signal generated by signal generator 80' is X'(n)=sin(8*q*COUNT).

The form of the error filter 86 represents a significant aspect of the present invention. However, prior to discussing implementations used to realize the error filter 86, the problem addressed by the present invention will be described to better understand the governing principles.

Conventional AVC systems can generally be implemented to effectively attenuate engine generated vibrational components that are transferred to the vehicle body when the motor vehicle is stationary. However, when the motor vehicle is driven, the applicants have found that conventional AVC systems can exhibit instabilities and excessive power usage, thereby preventing the effective and efficient cancellation of the body vibrations transferred from the engine.

The applicants have recognized that the above difficulties were due to relatively large amplitude body vibrations at one or more natural resonant frequencies characterizing the motor vehicle that become excited when the motor vehicle is driven over an undulating road surface. These natural resonant body vibrations are picked up by the AVC system body accelerometers and tend to dominate the developed error signals, since their amplitudes are typically several orders of magnitude greater than the amplitudes of the vibrational components transferred to the body from the engine. As a consequence, the error signals no longer provide the AVC system with the proper information for minimizing body vibration caused by the engine.

Figure 6:
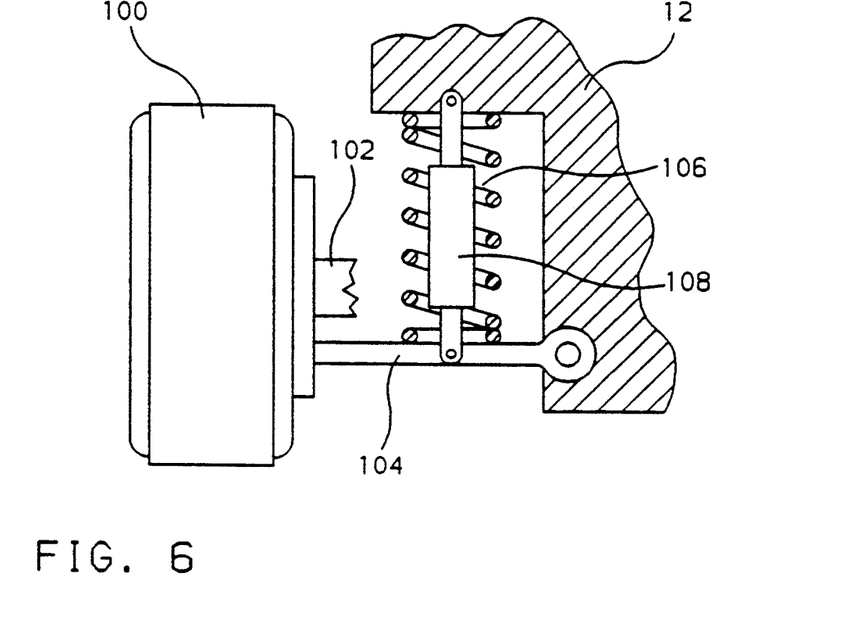
FIG. 6 illustrates diagrammatically a representative portion of a typical suspension system such as the one present in the motor vehicle of FIG. 1.

Referring now to FIG. 6, the nature of the natural resonant vibrational frequencies that characterize motor vehicle 10 will be discussed. FIG. 6 illustrates diagrammatically a representative portion of a typical suspension system such as the one present in motor vehicle 10, which supports the vehicle body 12 on tire 100 and wheel assembly 102. The wheel assembly 102 is pivotally connected to the vehicle body 12 by a road arm 104. As indicated, a coil spring 106 and a damping shock absorber 108 are typically interposed between the road arm 104 and the vehicle body 12.

Figure 7:
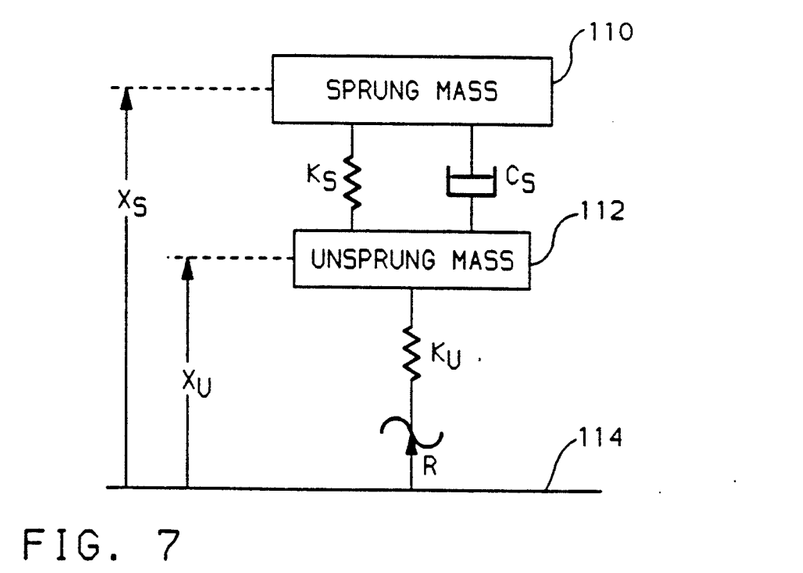
FIG. 7 presents a quarter vehicle model representing suspension interactions between the sprung and unsprung masses of the motor vehicle of FIG. 1.

Turning now to FIG. 7, there is shown a one quarter vehicle model commonly used in the vehicle suspension art to investigate vibration isolation, suspension travel, and road holding characteristics. In this model, the sprung mass 110 corresponds to one corner of the motor vehicle 10, which includes a corresponding portion of the vehicle body 12. The unsprung mass 112 includes the tire 100 and wheel assembly 102. The coil spring 106 is modeled as a linear spring having a spring constant $K_S$, and the shock absorber 108 is modeled as a linear damper having a damping rate $C_S$, both of which are interposed between the sprung and unsprung masses. The tire 100 is represented by a spring having stiffness $K_U$, interposed between the unsprung mass 112 and an undulating road surface represented by the variable vertical displacement R above the reference line 114.

It will be understood that the rms vertical accelerations of the sprung mass 110 and unsprung mass 112, in terms of their respective displacements $X_S$ and $X_U$, represent measures or their vibration levels. Also, it is known that when the vehicle is driven over an undulating road surface, the sprung and unsprung masses exhibit vibrational resonances at frequencies known as the sprung mass and unsprung mass natural frequencies, which are denoted herein as $f_S$ and $f_U$, respectively. The sprung mass 110 (vehicle body) vibrates at frequencies near both the sprung mass and unsprung mass natural frequencies, due to vibrations from the unsprung mass 112 (tire and wheel assembly) being transferred to the sprung mass 110 (vehicle body) through the spring and damper (coil spring 106 and shock absorber 108) represented respectively by the constants $K_S$ and $C_S$.

Figure 8:
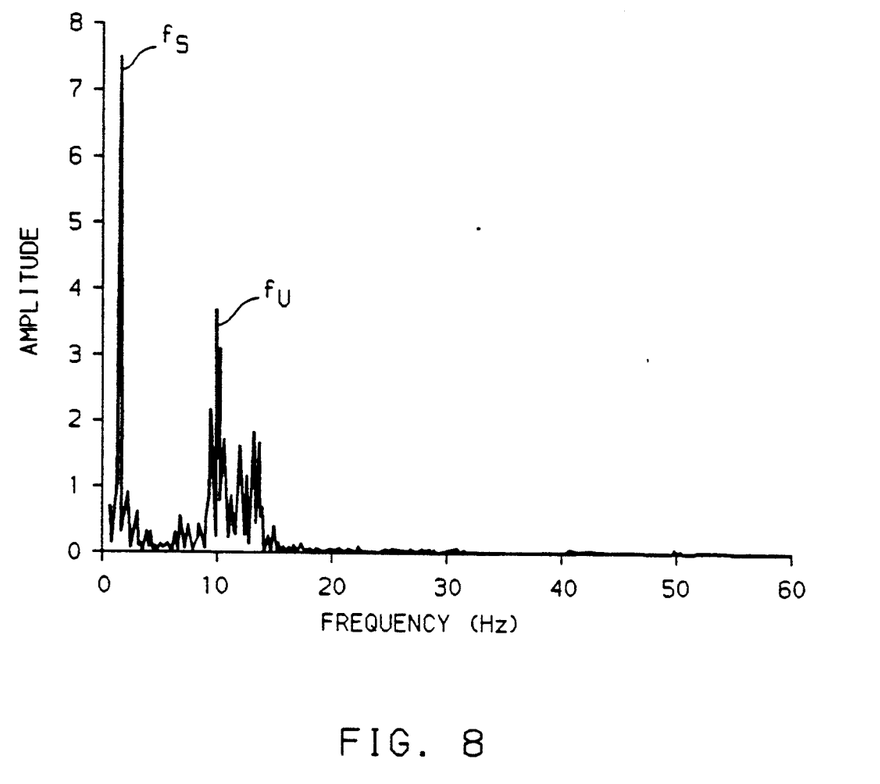
FIG. 8 presents graphically an amplitude versus frequency plot representing body vibrations excited when the motor vehicle of FIG. 1 is driven over undulating road surfaces.

Referring now to FIG. 8, there is shown an amplitude versus frequency plot representative of body vibrations excited when the motor vehicle 10 is driven over an undulating road surface. Such data can be obtained by monitoring the error signal ERROR1 developed by accelerometer 30 with a frequency spectrum analyzer, while driving the vehicle over a typical irregular road surface. As indicated, the amplitude of body vibrations near the sprung mass natural resonant frequency $f_S$ (1.4 Hz) are usually slightly larger than the amplitudes of body vibrations near the unsprung mass natural resonant frequency $f_U$ (9.6 Hz), for typical suspension systems. It will also be recognized from the plot that the amplitude of the resonant vibrations can be orders of magnitude greater than the amplitudes of vibrational components transferred to the body from the engine, which occur above 20 Hz.

The values for the sprung mass and unsprung mass natural resonant frequencies for a particular motor vehicle can shift slightly due to variations in temperature, changes in the number of vehicle passengers or other body loading, and extended use or aging of the vehicle. However, defined frequency ranges that embrace the sprung mass and unsprung mass natural resonant frequencies under these changing conditions can be established based upon rigid body calculations using the model in FIG. 7, or by experimental vehicle measurements. For the present embodiment, the defined frequency range expected to embrace the sprung mass natural resonant frequency under varying conditions was established to be from 0.9 to 1.5 Hz, while the defined frequency range expected to embrace the unsprung mass under varying conditions was established to be from 9 to 16 Hz. According to conventional practice, the analog error signal ERROR1 or the sampled version of the error signal E(n) is passed through a high pass filter at some point in the signal path between the accelerometer 30 and the adaptive filters 82 and 82' for the purpose of removing any DC or direct current component introduced into the ERROR1 signal by the accelerometer 30. The conventional high pass filter requires a pass band that includes the lowest frequencies of interest generated by engine 14, which is approximately 20 Hz in the present case, i.e. the second harmonic at the lowest expected engine idling speed of 700 RPM. The high pass filter is commonly implemented by either replacing the analog low pass filter 64 in the first channel 50 with an analog band pass filter, or by using a digital high pass filter as the error filter 86.

In the present embodiment, a simple first order high pass digital filter is included in the error filter 86 to remove any DC component from the error signal, along with one or more additional filters for removing the relatively large amplitude body vibrations associated with the sprung mass and/or the unsprung mass natural resonant frequencies for the motor vehicle 10.

Figure 9:
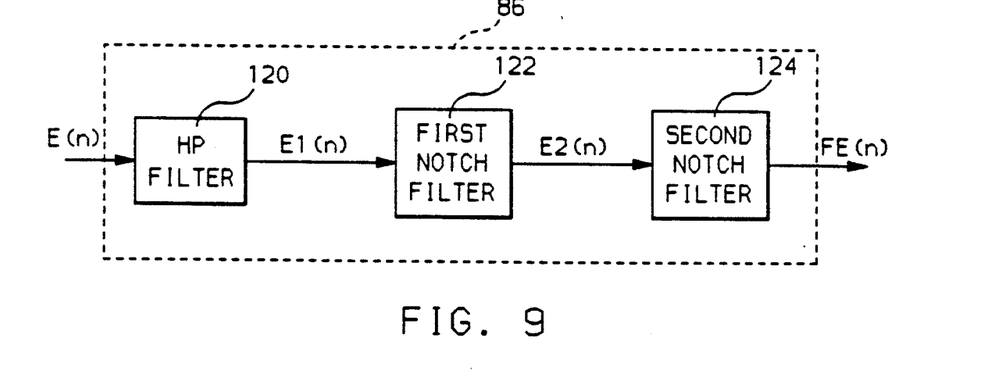
FIG. 9 provides a block diagram representing an error filter implementation for the preferred embodiment of the present invention.

FIG. 9 provides a block diagram representing the preferred implementation of the error filter 86 for the present embodiment. As shown, the error filter 86 includes a digital high pass filter 120, a first digital notch filter 122, and a second digital notch filter 124.

Figure 10A:
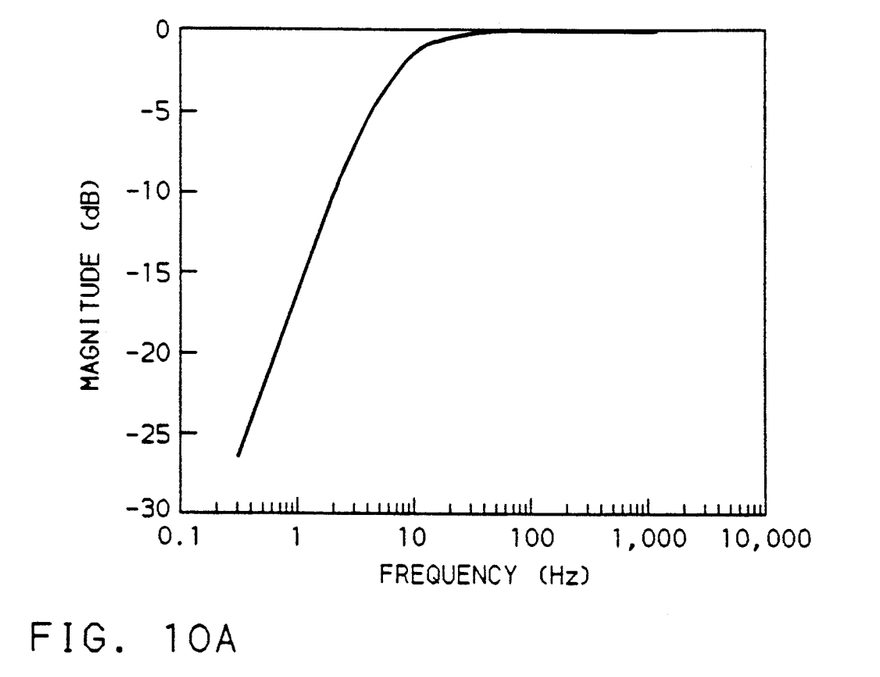
FIGS. 10A and 10B provide respectively, frequency plots representative of the magnitude and phase angle for the frequency response of a first order high pass filter included in the error filter of FIG. 9.
Figure 10B:
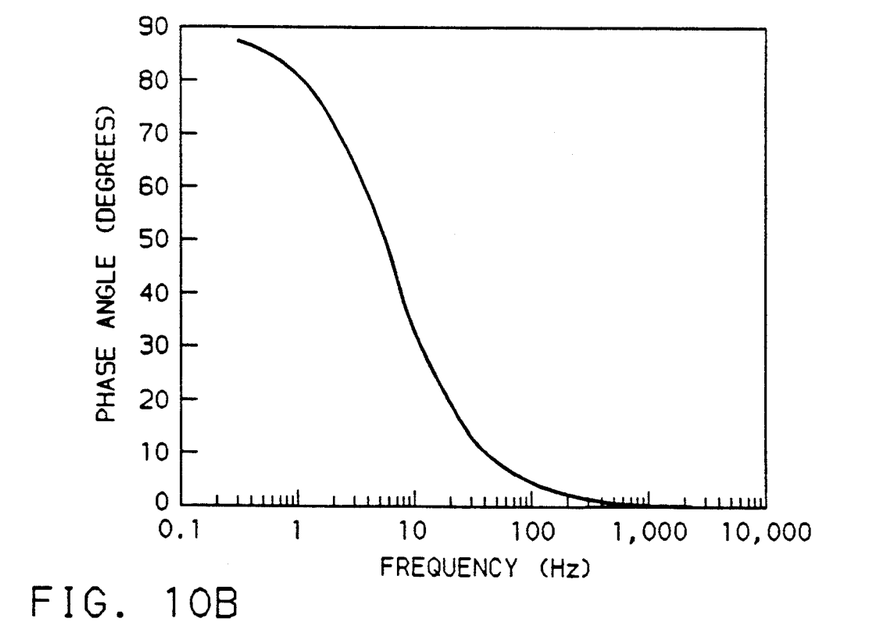

The high pass filter 120 is a standard first order digital high pass filter having its sampled output signal E1(n) related to the sampled error input signal E(n) according to:

$$E1(n) = b0^*E(n) + b1^*E(n-1) - a0^*E1(n-1), \quad (5)$$

where $b0 = 0.98814$, $b1 = -0.98814$ and $a0 = -0.97628$, for the 2.5 KHz sampling frequency of the DSP 54. FIGS. 10A and 10B provide graphs illustrating the magnitude and phase angle of the frequency response for the high pass filter 120 as a function of frequency. As indicated the high pass filter provides approximately 3 dB of attenuation at 5 Hz, and effectively removes any DC component from the ERROR1 signal.

The first notch filter 122 is a standard second order digital notch filter having its sampled output signal E2(n) related to its sampled input signal E1(n) according to:

$$e2 = b10^*E1(n) + b11^*E1(n-1) + b12^*E1(n-2)$$
$$+ a11^*e2(n-2) + a12^*E2(n-3), \quad (6)$$

where $b10 = 0.47399795$, $b11 = -0.94771527$, $b12 = 0.47399795$, $a11 = 0.98064663$, and $a12 = -0.48178904$ for the 2.5 KHz sampling frequency of the DSP 54. This provides the first notch filter 122 with an effective quality factor of $Q = 0.1$, and a notch frequency of $f_{N1} = 1.4$ Hz, which is equal to the measured sprung mass natural resonant frequency for motor vehicle 10, and is within the defined frequency range from 0.9 to 1.5 Hz expected to embrace the sprung mass natural resonant frequency under varying conditions.

The second notch filter 124 is a standard second order digital notch filter having its sampled output signal FE(n) (the sampled filtered error signal) related to its sampled input signal E2(n) according to:

$$FE(n) = b20^*E2(n) + b21^*E2(n-1) + b22^*E2(n-2)$$
$$+ a21^*FE(n-2) + a22^*FE(n-3), \quad (7)$$

where $b20 = 0.50000000$, $b21 = -0.9999938$, $b22 = 0.49099999$, $a21 = 0.96598661$, and $a22 = -0.46601053$ for the 2.5 KHz sampling frequency. This provides the second notch filter 124 with an effective quality factor of $Q = 1.3$, and a notch frequency of $f_{N2} = 9.6$ Hz, which is equal to the measured unsprung mass natural resonant frequency for motor vehicle 10, and is within the defined frequency range from 9 to 16 Hz expected to embrace the unsprung mass natural resonant frequency under varying conditions.

Figure 11A:
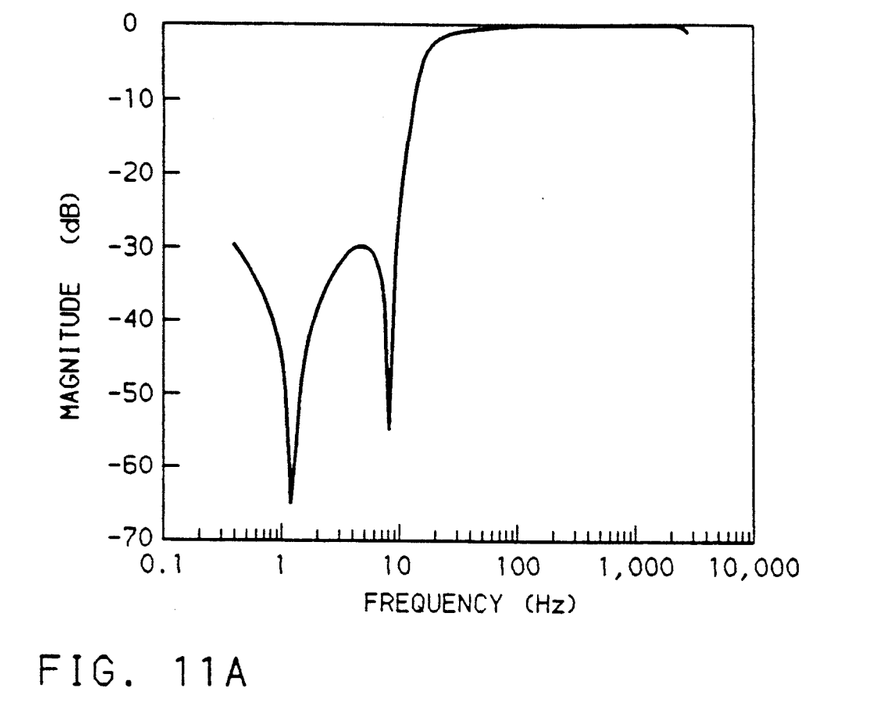
FIGS. 11A and 11B provide respectively, frequency plots representative of the magnitude and phase angle for the frequency response of the combined transfer function for the two notch filters included in the error filter of FIG. 9.
Figure 11B:
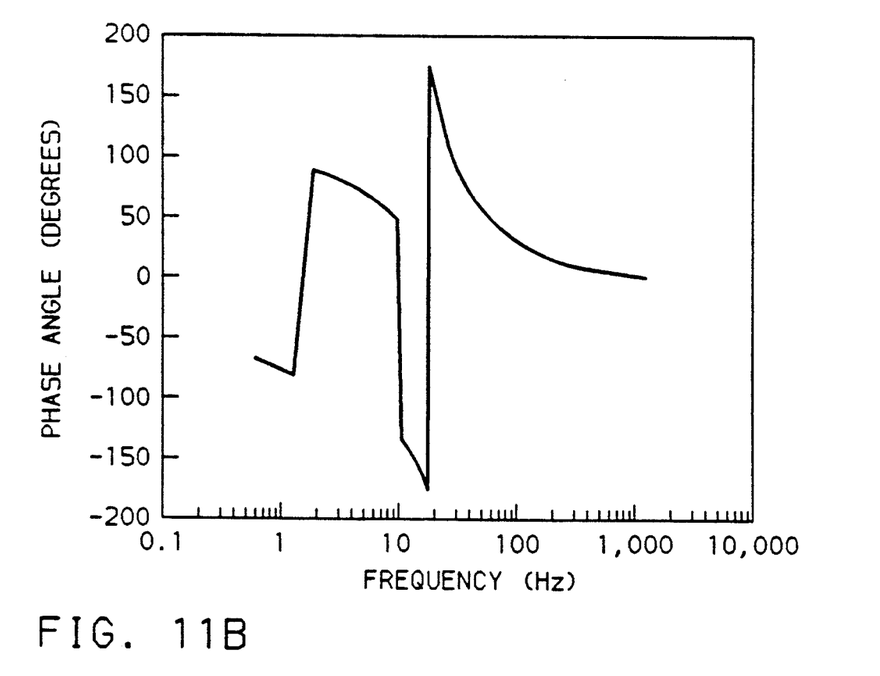

FIGS. 11A and 11B provide graphs illustrating the magnitude and phase angle of the combined frequency response of the two notch filters 122 and 124. It will be recognized that the two notch filters 122 and 124 effectively reduce the amplitudes of frequency components in the error signal E(n) near the unsprung and sprung mass resonant frequencies by approximately 50 and 60 dB, respectively. The applicants have found that this is sufficient to remove the corrupting influence of these signal components from the error signal so that the AVC system operates just as effectively when the motor vehicle is being driven as when it is stationary.

It will also be recognized from FIG. 10A that the first order high pass filter 120, when acting alone, provides attenuation of only 2 and 13 dB, respectively, for signal components in the E(n) signal having frequencies near the unsprung and sprung mass resonant frequencies, which is insufficient to enable effective operation of the AVC system when the motor vehicle 10 is driven over an irregular road surface.

The applicants have found that without the two notch filters, the AVC system in a driven motor vehicle can not be made to operate satisfactorily by merely increasing the order of the high pass filter 120 to achieve increased attenuation at the unsprung and sprung mass resonant frequencies. A high pass filter having an order of less than four does not provide sufficient attenuation at the unsprung and sprung mass resonant frequencies, while increasing the order to four or more has been found to introduce large and sharp phase angle transitions in the filter transfer function in the pass band at frequencies above 20 Hz. These same phase angle transitions are then introduced into the filter error signal FE(n), which can cause improper updating and convergence of the adaptive filters 82 and 82'. This is not the case with the error filter 86 of the present embodiment containing the first order high pass filter 120 and the two notch filters 122 and 124. As can be seen from FIGS. 10B and 11B, no sharp transitions in the phase angle of the frequency response for the transfer functions of the first order high pass filter 120 or the two notch filters 122 and 124 occur above 20 Hz.

Figure 12:
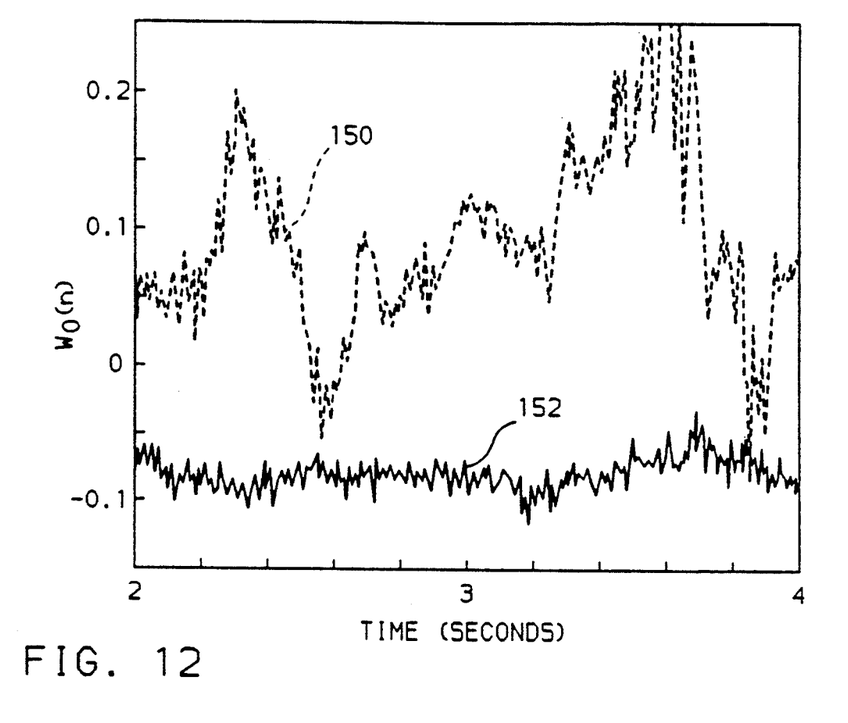
FIG. 12 illustrates graphically curves representing time changes in the magnitude of a first weighing coefficient $W_0$ for an adaptive filter within the AVC system when the error filter includes only a conventional high pass filter, and when the error filter includes the preferred dual notch filter of the present invention.
Figure 13:
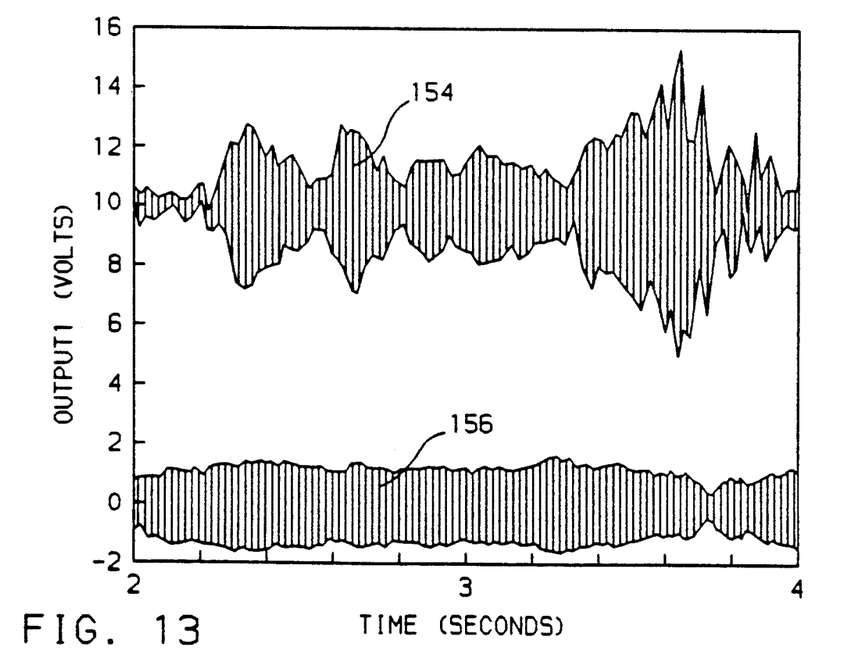
FIG. 13 illustrates graphically curves representing time changes in the amplitude of a signal driving an AVC actuator as the motor vehicle is driven over a typical undulating road surface when the error filter includes only a conventional high pass filter and when the error filter includes the preferred dual notch filter of the present invention.

FIGS. 12 and 13 illustrate measured data demonstrating the improved performance of the AVC system achieved by including two notch filters 122 and 124 in the error filter 86 as compared to the performance when using only a conventional fourth order high pass filter as the error filter 86.

FIG. 12 illustrates graphically curves representing changes in the magnitude of the first weighing coefficient $W_0(n)$ (see equation (2)) for the adaptive filter 82 as a function of time, while the motor vehicle is being driven on a typical undulating road surface. Curve 150 shows the time variation in $W_0(n)$ when the error filter 86 consists only of a conventional fourth order high pass filter having a 3 dB cutoff frequency of approximately 13 Hz. Curve 152 shows the time variation in $W_0(n)$ when the error filter 86 includes the first order high pass filter 120, the first notch filter 122, and the second notch filter 124. To ease comparison, curve 152 has been offset from curve 150 by subtracting a constant value (approximately 0.12) from each of the original values of $W_0(n)$ representing curve 152. The time variations in the value of $W_0(n)$ for curve 150 are quite substantial compared to the relatively constant value of $W_1(n)$ for curve 152. This indicates a lack of convergence of the adaptive filter 82 when the error filter 86 only performs only conventional high pass filtering of the error signal E(n), as opposed to quite stable behavior of the adaptive filter 82 when the notch filters 122 and 124 are included in the error filter 86.

FIG. 13 graphically illustrates curves representing changes in the amplitude of the analog signal OUTPUT1 driving the inertial mass shaker 34 as a function of time, while driving the motor vehicle over the typical undulating road surface. Curve 154 shows the time variation in the amplitude envelope of OUTPUT1 when the error filter 86 contains only the conventional fourth order high pass filter, while curve 156 shows the time variations in the amplitude envelope of OUTPUT1 when the error filter 86 includes first order high pass filter 120 along with the two notch filters 122 and 124. To ease comparison, curve 150 has been offset from curve 156 by adding a constant value (approximately 10) to each of the original values of OUTPUT1 representing curve 154. It will be recognized that without the notch filters 122 and 124 included in the error filter 86, the swings in amplitude of the OUTPUT1 signal are two to four times as large as when the two notch filters 122 and 124 are included in the error filter 86. This indicates that the power usage of the AVC system is significantly reduced when using the two notch filters 122 and 124 in the error filter 86. Also, if the amplitude swings in the OUTPUT1 signal become large enough, the saturation limit of the inertial mass shaker can be exceeded, which results in a chattering noise due to the inertial mass shaker 34 being alternately driven against its internal stops.

From the foregoing, it will be recognized that the present invention enables AVC systems to operate efficiently and effectively in reducing vibration of a vehicle body due to engine operation when the motor vehicle is driven over an undulating road surface.

The parallel configuration of the two signal generators 80 and 80' and two adaptive filters 82 and 82' illustrated in FIG. 4 represent only one of many such configurations that can be implemented by the DSP 54 for producing the canceling output signal $Y_T(n)$ based upon the input COUNT signal and the filtered error signal FE(n) produced in accordance with the principles of the present invention. For example, additional parallel signal generator and adaptive filter pairs could be added to increase the number of signal components in $Y_T(n)$ having frequencies corresponding to those of additional vibrational components generated by engine 14. Conversely, a single signal generator and paired adaptive filter could be used to generate $Y_T(n)$ (without the signal summer 84) by implementing the single signal generator to produce multiple signal components at different frequencies related to the fundamental frequency of the engine 14. In fact, the simplest functional embodiment of the invention requires only one signal generator and one adaptive filter, where the signal produced by the signal generator contains a single component having the same frequency as one of the vibrational components generated by the engine.

The present invention is also applicable to configurations of signal generators and adaptive filters described in pending U.S. patent application Ser. No. 07/842,880 filed on Feb. 26, 1992, which is a continuation in part of U.S. patent application Ser. Nos. 07/62081 filed on Dec. 3, 1990 and 07/565395 filed on Aug. 10, 1990, both now abandoned; and U.S. patent application Set. Nos. 07/875,775, now abandoned, 07/875,893, now U.S. Pat. No. 5,222,148, and pending U.S. patent application 07/875,897 all filed contemporaneously on Apr. 29, 1992. These applications, all of which are assigned to the same assignee as the present application, describe different inventions for improving the performance of active noise and vibration control systems such as output saturation control; amplitude modulation of signal generator outputs based on engine rotational speed; and scaling of adaptive filter convergence and leakage factors based upon engine rotational acceleration, and engine rotational speed and acceleration, respectively.

The error filter 86 can also take on forms different from that specifically illustrated in FIG. 9, and still provide improved operation of the AVC system. For example, the error filter 86 could include only a single notch filter for removing frequencies near the sprung mass natural resonant frequency, or alternatively, the unsprung mass resonant frequency, and operation of the AVC system would be improved over that provided by the conventional high pass filtering of the error signal E(n). The error filter 86 could also include one or more notch filters having notch frequencies set equal to low frequency vibrational body resonances caused by body bending or beaming excited by driving the motor vehicle 10 over undulating road surfaces. Also, it will be recognized by those skilled in the art that notch filters 122 and 124 can be implemented as adaptive or tracking filters with adjustable notch frequencies that track changes in the natural body resonant frequencies. It will also be understood that the filtering performed by the digital error filter 86 could just as easily be performed by an equivalent analog filter positioned, for example, in between the accelerometer 30 and the sample and hold circuit 66.

Therefore, the aforementioned description of the preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. An active vibration control system for a motor vehicle, the motor vehicle including a body, an engine mounted to the body, wherein the motor vehicle is characterized by at least one defined frequency range embracing a natural resonant frequency at which the body vibrates when the motor vehicle is driven over an undulating road surface, and operation of the engine generates vibrational frequency components that are transferred to the vehicle body causing vibration thereof, the active vibration control system comprising:
   means for generating an input signal representative of at least one of the vibrational frequency components transferred from the engine to the body causing vibration thereof;
   an adaptive filter having adjustable filtering characteristics for filtering the generated input signal to produce an output signal;
   an actuator attached to the body and responsive to the output signal generated by the adaptive filter for inversely vibrating the body with respect to at least one of the vibrational frequency components transferred from the engine to the body;
   a sensor for monitoring vibration of the body and for developing an error signal representative thereof;
   an error filter for filtering the error signal to produce a filtered error signal, the error filter including at least one notch filter having a notch frequency in the defined frequency range embracing the natural resonant frequency characterizing the motor vehicle;
   means for adaptively adjusting the filtering characteristics of the adaptive filter based upon the filtered error signal to minimize vibration of the vehicle body caused by at least one of the vibrational frequency components transferred to the body from the engine.

2. The active vibration control system described in claim 1, wherein:
   the motor vehicle is further characterized by a sprung mass including the body; and
   the natural resonant frequency characterizing the motor vehicle is that of the sprung mass.

3. The active vibration control system described in claim 1, wherein:
   the motor vehicle is further characterized by an unsprung mass including a wheel assembly; and
   the natural resonant frequency characterizing the motor vehicle is that of the unsprung mass.

4. The active vibration control system described in claim 1, wherein the notch frequency of the notch filter is equal to the natural resonant frequency characterizing the motor vehicle.

5. The active vibration control system described in claim 1, wherein:
   the motor vehicle is characterized by multiple defined frequency ranges, with each defined frequency range embracing a different natural resonant frequency at which the body vibrates when the motor vehicle is driven over an undulating road surface; and
   the error filter includes a plurality of notch filters with each notch filter having a notch frequency in a different one of the multiple defined frequency ranges.

6. The active vibration control system described in claim 5, wherein the notch frequency of each notch filter is equal to a different one of the natural resonant frequencies at which the body vibrates.

7. The active vibration control system described in claim 5, wherein:
   the motor vehicle is further characterized by a sprung mass including the body and an unsprung mass including a wheel assembly; and
   the notch filter includes a pair of notch filters, one notch filter having a first notch frequency in a first defined frequency range characterizing the natural resonant frequency for the sprung mass, the other notch filter having a second notch frequency in a second defined frequency range characterizing the natural resonant frequency for the unsprung mass.

8. An active vibration control system for a motor vehicle, the motor vehicle having a sprung mass including a body, an unsprung mass including a vehicle wheel assembly, and an engine supported on the body by a mounting unit, the motor vehicle being characterized by sprung mass and unsprung mass natural resonant frequencies at which the body vibrates when the motor vehicle is driven on an undulating road surface, and the operation of the engine generates vibrational frequency components that are transferred through the mounting unit to the body causing vibration thereof, the active vibration control system comprising:
   means for sensing changes in engine rotation, and for deriving therefrom, an input signal representative of at least one of the vibrational frequency components transferred from the engine through the mounting unit to the body;
   an adaptive filter having adjustable filtering characteristics for filtering the generated input signal to produce an output signal;
   an inertial mass shaker attached to the body and responsive to the output signal generated by the adaptive filter for inversely vibrating the body with respect to at least one of the vibrational frequency components transferred from the engine through the mounting unit to the body;
   a sensor mounted on the body proximate to the inertial mass shaker for monitoring vibration of the body and for developing an error signal representative thereof;
   an error filter for filtering the error signal to produce a filtered error signal, the error filter including a first notch filter having a first notch frequency in a first defined frequency range embracing the unsprung mass natural resonant frequency and a second notch filter having a second notch frequency in a second defined frequency range embracing the sprung mass natural frequency;

means for adaptively adjusting the filtering characteristics of the adaptive filter based upon the filtered error signal to minimize vibration of the vehicle body caused by at least one of the vibrational frequency components transferred to the body from the engine through the mounting unit.

9. An active vibration control system for a motor vehicle, the motor vehicle having a sprung mass including a body, an unsprung mass including a vehicle wheel assembly, and an engine supported on the body by multiple mounting units, the motor vehicle being characterized by sprung mass and unsprung mass natural resonant frequencies at which the body vibrates when the motor vehicle is driven on an undulating road surface, and the operation of the engine generates vibrational frequency Components that are transferred through the mounting units to the body causing vibration thereof, the active vibration control system comprising:

means for sensing changes in engine rotation, and for deriving therefrom, an input signal representative of at least one of the vibrational frequency components transferred from the engine through the mounting units to the body;

a plurality of adaptive filters, each adaptive filter having adjustable filtering characteristics for filtering the generated input signal to produce a respective output signal;

a plurality of inertial mass shakers, each inertial mass shaker attached to the body proximate a nearest one of the mounting units and responsive to the output signal generated by the adaptive filter for inversely vibrating the body with respect to at least one of the vibrational frequency components transferred from the engine through the corresponding mounting unit to the body;

a plurality of sensors, each sensor mounted on the body proximate to a nearest one of the mounting units for monitoring vibration of the body and for developing a respective error signal representative thereof;

a plurality of error filters, each error filter operating to filter a respective one of the error signals to produce a respective filtered error signal and respectively including a first notch filter having a first notch frequency in a first defined frequency range embracing the unsprung mass natural resonant frequency and a second notch filter having a second notch frequency in a second defined frequency range embracing the sprung mass natural frequency;

means for adaptively adjusting the filtering characteristics of each of the adaptive filters based upon the respective filtered error signal to minimize vibration of the vehicle body caused by at least one of the vibrational frequency components transferred from the engine to the body through the corresponding mounting unit.

10. An active vibration control system for a motor vehicle, the motor vehicle having a sprung mass including a body, an unsprung mass including a vehicle wheel assembly, and an engine supported on the body by a mounting unit, the motor vehicle being characterized by sprung mass and unsprung mass natural resonant frequencies at which the body vibrates when the motor vehicle is driven on an undulating road surface, and the operation of the engine generates vibrational frequency components that are transferred through the mounting unit to the body causing vibration thereof, the active vibration control system comprising:

means for sensing changes in engine rotation, and for deriving therefrom, a plurality of input signals, each input signal representative of a different vibrational frequency components transferred from the engine through the mounting unit to the body;

a plurality of adaptive filters, each adaptive filter having adjustable filtering characteristics for filtering a respective one of the generated input signal to produce a respective output signal;

means for summing the plurality of output signals to produce a canceling signal;

an inertial mass shaker attached to the body proximate the mounting unit and responsive to the canceling signal for inversely vibrating the body with respect to a plurality of different vibrational frequency components transferred from the engine through the mounting unit to the body;

a sensor mounted on the body proximate to the mounting unit for monitoring vibration of the body and for developing an error signal representative thereof;

an error filter operating to filter the error signal to produce a filtered error signal, the error filter including a first notch filter having a first notch frequency in a first defined frequency range embracing the unsprung mass natural resonant frequency and a second notch filter having a second notch frequency in a second defined frequency range embracing the sprung mass natural frequency;

means for adaptively adjusting the filtering characteristics of each of the adaptive filters based upon the filtered error signal to minimize vibration of the vehicle body caused by a plurality of different vibrational frequency components transferred from the engine to the body through the mounting unit.

* * * * *